United States Patent
Müller et al.

(10) Patent No.: US 6,615,099 B1
(45) Date of Patent: Sep. 2, 2003

(54) METHOD AND DEVICE FOR CALIBRATING A WORKPIECE LASER-PROCESSING MACHINE

(75) Inventors: Lothar Müller, Heidelberg (DE); Mladen Polgar, Stutensee (DE); Hubert De Steur, Drongen (BE); Mark Van Biesen, Gent (BE); Friedbert Roth, Dettenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,585

(22) PCT Filed: Jul. 1, 1999

(86) PCT No.: PCT/DE99/01914

§ 371 (c)(1),
(2), (4) Date: Jan. 11, 2001

(87) PCT Pub. No.: WO00/03833

PCT Pub. Date: Jan. 27, 2000

(30) Foreign Application Priority Data

Jul. 13, 1998 (DE) .......................................... 198 31 340

(51) Int. Cl.⁷ .............................................. G06F 19/00
(52) U.S. Cl. ................... 700/166; 700/160; 219/121.68
(58) Field of Search .............. 700/95, 166; 219/121.11, 219/121.6–121.83; 372/31

(56) References Cited

U.S. PATENT DOCUMENTS

| 4,584,455 A | | 4/1986 | Tomizawa |
| 4,618,759 A | * | 10/1986 | Muller et al. ........... 219/121.75 |
| 4,865,683 A | * | 9/1989 | Burns ...................... 219/121.8 |
| 4,928,284 A | * | 5/1990 | Burns .......................... 372/31 |
| 5,315,111 A | * | 5/1994 | Burns et al. ............. 219/121.8 |
| 5,670,068 A | | 9/1997 | Kuriyama et al. |

FOREIGN PATENT DOCUMENTS

| DE | 44 37 284 A1 | 4/1996 |
| WO | WO 97/25177 | 7/1997 |

* cited by examiner

Primary Examiner—Leo Picard
Assistant Examiner—Walter Russell Swindell
(74) Attorney, Agent, or Firm—Harness, Dickey & Pierce, P.L.C.

(57) ABSTRACT

A method and arrangement for calibrating a laser processing machine for processing workpieces. The present invention ensures a fast and reproducible method and arrangement for calibrating a laser processing machine by measuring a position of a predetermined test pattern on a test plate while taking into account any imaging errors caused by the deflection unit.

11 Claims, 2 Drawing Sheets

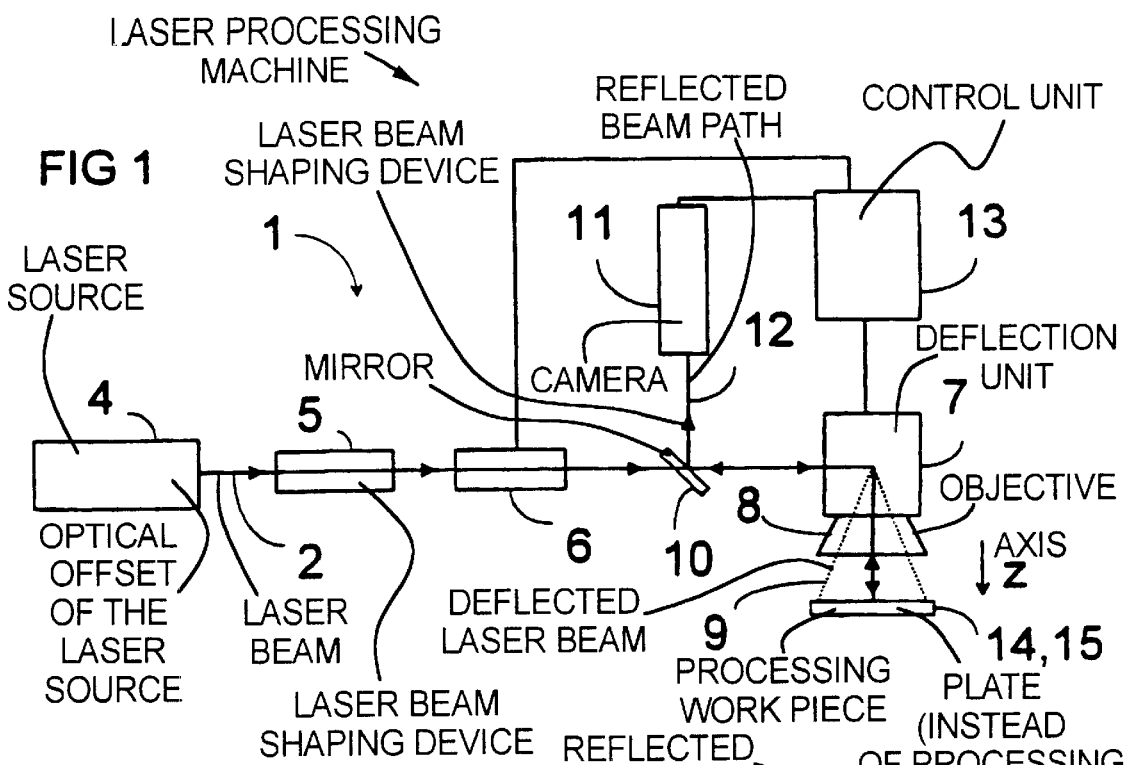

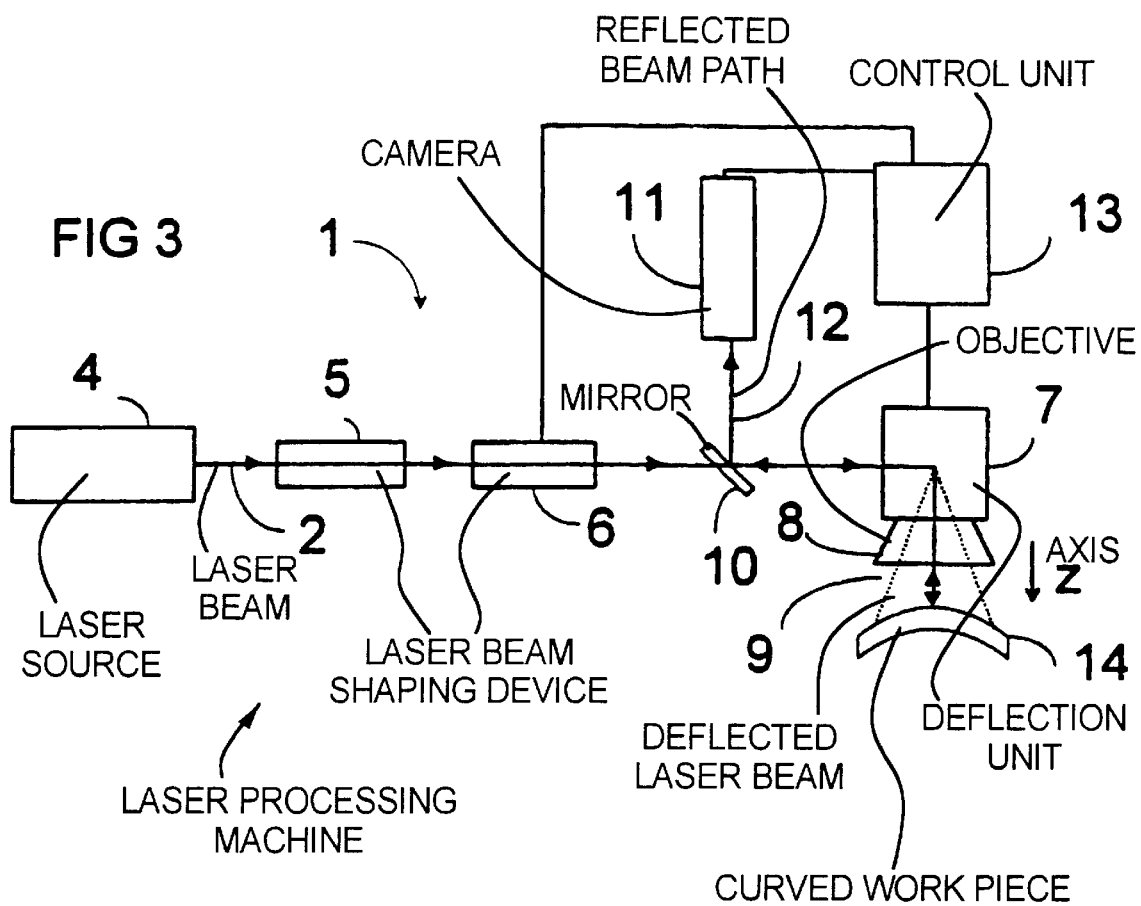

METHOD AND DEVICE FOR CALIBRATING A WORKPIECE LASER-PROCESSING MACHINE

BACKGROUND OF THE INVENTION

1. Field of the Invention

The invention relates to a method and an arrangement for calibrating a laser processing machine for processing workpieces.

2. Description of the Related Art

The processing of workpieces using lasers is acquiring increasing importance principally in the field of micromachining, for example in laser direct structuring, in laser drilling, in laser fusion, in laser soldering, in laser inscription and in laser cutting. In laser drilling and in the structuring of wiring components (printed circuit boards and multichip modules), it is possible to produce holes and conductor structures having structure dimensions of less than 50 µm. Prototypes having conductor track structures of 20 µm have already been displayed. Accuracy is extremely important with these structure finenesses. The goal is to produce structure dimensions of less 10 µm. Inaccuracy in successive processing steps, for example, drilling and structuring on preformed injection-molding parts or substrates, needs to be alleviated. This is because this inaccuracy to a large extent, determines the structure's size; for example, for reliable isolation of conductor tracks that run parallel, it would be necessary to take into account large tolerances. This leads to large spacings between the conductor tracks and thus enlarge the structure's size.

German document DE 44 37 284 discloses a method for calibrating a controller for deflecting a laser beam, in which a light-sensitive medium is irradiated with a laser beam at predetermined positions for the purpose of generating a test image and afterwards, in a separate apparatus, digitized individual images of image excerpts from the test image are generated and from them correction data are determined for the controller for deflecting the laser beam. The separate measurement of the test image is time-consuming and a separate apparatus is required for the measurement; moreover, only the entire laser beam arrangement is calibrated by means of this method, a detailed calibration of individual components is not possible.

U.S. Pat. No. 4,584,455 discloses a machine for processing workpieces by means of laser beams, which provides, in addition to a processing laser beam, a laser beam superposed therewith in the visible region, the position of which on a workpiece is measured with the aid of a camera. This measured position is compared with a desired position and the processing laser beam is controlled in such a way that the difference between the desired position and the measured position is taken into account. In this case, the camera only has a field of view which encompasses part of the workpiece, with the result that deviations which are mirrored in other parts of the workpiece cannot be taken into account.

SUMMARY OF THE INVENTION

The object of the invention, therefore, is to specify a fast and reproducible method and an arrangement for calibrating a laser processing machine which ensures highly accurate processing of workpieces in the entire workpiece region.

This object is achieved according to the present invention in an arrangement for a laser processing calibration, including a laser source, a device for shaping the laser beam, a deflection device for the laser beam, a camera for visually observing the workpiece and an objective for focusing a deflected laser beam on to the workpiece.

This arrangement is operated by first positioning in front of the objective a calibration plate and recording its image. This image is generated by the deflection unit moving the objective and the field of view of the camera over the calibration plate. This image is supplied to a control unit which determines any imaging errors that are caused by the deflection unit.

Subsequently, the calibration plate is removed and a test plate is placed in front of the objective. The laser beam then writes attest pattern onto the test plate with a predetermined drive of the deflection unit. The position of the test pattern is measured and the optical offset of the laser source is determined based on the measured position of the test pattern, taking in to account any imaging errors that were previously determined with patent claim 6.

The optical imaging according to the present invention, is characterized by two mutually separate, successive method steps, first the deflection device for the laser beam and the objective are measured by a calibration plate, instead of the workpiece. The calibration plate is positioned in front of the objective and the image of the calibration plate, is being generated by the objective and the deflection device is measured by a camera. The field of view of the camera is moved over the calibration plate under the control of the deflection device. Accordingly, the entire region which can be occupied by a workpiece is calibrated. Because the deflection device (unit) and the objective always remain together in the beam path, the imaging error caused by these two units can then be analyzed in the camera, and stored, then taken into account during the subsequent processing of workpieces. In the second step, the components which generate the laser beam are characterized. As such, the laser beam, which is generated by a laser source and is shaped by a device for shaping the laser beam, writes a predetermined pattern (test marking) onto a test plate via the deflection device. This test marking is subsequently measured and by taking into account the previously determined imaging errors of the deflection device and the objective, the optical offset that is caused by the laser source and the device for shaping the laser beam, is determined. Here, the optical offset is the difference between a predetermined desired position and the actual position of the test marking. This optical offset is also stored and taken into account during subsequent processing of workpieces. The method operates without a special device for measuring the test markings if the camera measures the test plate via the deflection device and the objective.

Another aspect of the invention is the optical construction is configured particularly advantageously if a mirror, transparent to the laser light is placed in the beam path between the device for shaping the laser beam and the deflection unit the such mirror that it reflects the light for the measurement of the calibration plate and/or the test plate into the camera.

The influence of workpieces on the optical imaging is advantageously taken into account by the camera that records the reference points arranged on the workpiece. Later the measured influences are stored and taken into account during subsequent processing.

Thus, particularly in the case of structuring of non-planar areas of workpieces, the influence of the lack of planarity is taken into account by the data provided beforehand, with the result that even curved substrates, for example, can be written on by the laser processing machine.

Another aspect of the invention provides for processing curved workpieces, in which the focal point of the imaging by the objective is adapted to the corresponding curvature of the workpiece by a device for modulating the optical path.

BRIEF DESCRIPTION OF THE DRAWINGS

FIG. 1 shows the schematic construction of a laser processing machine for the structuring and/or measurement of a workpiece or of a test plate, FIG. 2 shows the schematic construction of a laser processing machine for the measurement of a calibration plate, and FIG. 3 shows the schematic construction of a laser processing machine for the structuring of a workpiece.

DETAILED DESCRIPTION OF THE PREFERRED EMBODIMENTS

The present invention is explained in more detail using exemplary embodiments as shown in FIG. 1, FIG. 2 and FIG. 3.

A laser processing machine 1 is illustrated in which a structure is written into a workpiece 14 by means of a laser beam 2. The structure may be produced by drilling, fusion, soldering or cutting. The laser beam 2 is generated by a laser source 4 and expanded by a device 5 for expanding the laser beam 2. In order to modulate the optical path of the laser beam 2, a device for modulation 6 is subsequently arranged in the beam path before the laser beam is imaged onto the workpiece 14—curved in this example—by a deflection device 7 and an objective 8. In one embodiment, two mirrors (not illustrated), which are arranged perpendicularly to one another are provided in the deflection device 7. The mirrors move the laser beam over the area of the workpiece 14, so that the entire area of the workpiece 14 can be processed by the deflected laser beam 9. Here, the device 5 expands the laser beam and the device 6 modulates the optical path of the laser beam 2, and together they form a device for shaping the laser beam 2. The device 6 for modulating the optical path of the laser beam 2 is controlled by a control device 13. Consequently, the focal point of the laser beam 2, downstream of the objective 8, is shifted in the Z-direction, i.e. in the propagation direction of the laser beam 2. Through this control, the focal point of the laser beam 2 can be adapted to a curved structure of a workpiece 14. In order to measure the imaging errors of the deflection device 7 and of the objective 8, a partially transparent mirror 10 is arranged in the beam path between the device 6 for modulating the optical path and the deflection device 7. In one embodiment, this mirror 10 is transparent to the laser beam 2 and reflects the light coming through the objective 8 and the deflection device 7 from the direction of the workpiece 14 into a camera 11, which is likewise connected to the control device 13 for evaluation purposes. Another embodiment which is also possible but is not illustrated is one in which the mirror 10 is transparent to the light from the direction of the workpiece 14 and reflects the laser beam 2 in the direction of the workpiece 14.

The method for calibrating the laser processing machine 1 proceeds, as follows. As is illustrated in FIG. 2, first a calibration plate 3 with patterns (for example a grid with a predetermined grid spacing) situated on the calibration plate 3 is imaged onto the camera 11 through the objective 8 and the deflection device 7 via the mirror 10. In this case, the control unit 13 controls the deflection device 7 in such a way that the beam path 12 of the image of the calibration plate 3 is moved over the entire calibration plate 3. Using the markings of the calibration plate 3, it is possible to characterize the beam path and thus the imaging errors of the objective 8, of the deflection device 7, of the mirror 10 and of the camera 11. The imaging errors that have been identified are stored in the control device 13 and are compensated for during the subsequent processing of workpieces 3.

In the second step of the method, instead of the calibration plate 3, a test plate 15, for example made of aluminum, is positioned in front of the objective. The laser beam 2 then writes a predetermined pattern (test marking) onto the test plate 15 by means of a predetermined control of the deflection device 7. The position of this test marking is then imaged via the mirror 10 onto the camera 11 via the beam path in accordance with the image of the calibration plate. In the control device 13, taking account of the imaging errors previously determined, the optical offset which occurred during the structuring of the test marking is determined, stored and taken into account during the processing of workpieces.

In order to process curved workpieces 14, as illustrated in FIG. 3, the influence of the geometrical shape and/or of the optical imaging properties of the workpieces 14 is additionally being determined. As such, reference points which are already present on the workpiece 14 are imaged onto the camera 11 via the objective 8 and the deflection device 7 and also the mirror 10. In the control device 13. The workpiece influence is then determined A from the imaging errors previously determined and the optical offset. The method can then subsequently be used for identical workpieces in order to control the device for modulating the optical path 6 such that that the focal point of the laser beam 2 is oriented optimally to the surface of the workpiece 14.

This method and the arrangement also take into account, among other things the errors caused by the driving of the motors for the mirrors of deflection device 7.

Although other modifications and changes may be suggested by those skilled in the art, it is the intention of the inventors to embody within the patent warranted hereon all changes and modifications as reasonably and properly come within the scope of their contribution to the art.

We claim:

1. A method for calibrating a laser processing machine for processing workpieces, comprising:

positioning a calibration plate in front of an objective;

recording an image of the calibration plate, which is generated by the objective and a deflection unit, by moving the objective and a field of view of a camera over the calibration plate under control of the deflection unit;

determining imaging errors caused by the deflection unit and by the objective from said image in a control unit, the control unit being connected downstream of the camera;

storing said imaging errors;

positioning a test plate in front of the objective;

writing a test pattern onto the test plate by a laser beam from a laser source with a predetermined drive of the deflection unit;

measuring a position of the test pattern;

determining an optical offset of the laser source based on a measured position of the test pattern taking said imaging errors into account;

storing the optical offset; and compensating for the stored optical offset and the stored imaging errors during the processing of workpieces.

2. A method according to claim 1, further comprising the steps of:
- moving the field view of the camera over the test plate by the deflection unit; and
- measuring the position of the test pattern.

3. A method according to claim 1, further comprising the step of:
- diverting the image of the calibration plate into the camera by a mirror, said mirror being placed in a beam path of the laser beam between a device for shaping the laser beam and the deflection unit, said mirror being transparent to a laser light from the laser source, said mirror being reflective to a light with which the camera records the image of the calibration plate.

4. A method according to claim 1, further comprising the steps of:
- recording via the camera reference points that are arranged on one of the workpieces to be processed,
- determining in the control unit a workpiece's influence on an imaging, said influence on the imagine based on said recording while taking into account the imaging errors and the optical offset;
- storing the workpiece's influence on the imaging; and
- taking into account the workpiece's influence during subsequent processing of the workpiece.

5. A method according to claim 4, for providing data for structuring non-planar areas of workpieces, further comprising the step of:
- altering an optical path of the laser beam by a device for modulating the optical path, said device being controlled by said control unit such that a focal point of the imaging is adapted by the objective in accordance with a geometrical shape of the workpiece.

6. An arrangement for calibrating a laser processing machine for processing of workpieces comprising:
- a laser source;
- a device for shaping a laser beam, said laser beam being emitted from said laser source;
- a deflection device for the laser beam;
- a camera for visually observing a workpiece;
- a control device for the deflection device and the camera and the device for shaping the laser beam, said control device connected downstream of the camera for imaging error determination;
- an objective for focusing a deflected laser beam on the workpiece;
- a partially transparent mirror located in a path of the laser beam;
- a calibration plate, said calibration plate initially placed in front of the objective, an image of the calibration plate is recorded by movement of a field of view of the camera under control of the deflection device, based on said image the control device determines imaging errors generated by the deflection device and the objective; and
- a test plate, said test plate being placed in front of the objective subsequent to removal of the calibration plate from a front of the objective, said laser beam writes a test pattern on the test plate by a predetermined drive of the deflection unit, said position of the test pattern being measured and with said imaging errors, being utilized for determination of an optical offset of said laser source.

7. An arrangement according to claim 6, wherein:
- the device for shaping the laser beam further comprises a device that expands the laser beam and a device that modulates an optical path of the laser beam.

8. An arrangement according to claim 6, wherein:
- the partially transparent mirror deflects the laser beam in a direction of the workpiece, said partially transparent mirror deflects a light from the workpiece in a direction of the camera, said partially transparent mirror being placed between the device for shaping the laser beam and the deflection device.

9. An apparatus for compensating during processing of workpieces, comprising:
- first means for recording an image of a calibration plate positioned in front of an objective, the image being generated by the objective and deflection unit, by moving the objective and a field of view over the calibration plate under control of the defection unit;
- second means for determining imaging errors caused by the deflection unit and by the objective from said image;
- third means for storing said determined imaging errors; and
- laser means for writing a test pattern onto a test plate positioned in front of the objective, with a predetermined drive of the deflection unit, wherein a position of the test pattern is measured, the second means further determining an optical offset of the laser means based on the measured position of the test pattern, taking said determined imaging errors into account;
- said third means storing the optical offset, wherein, during the processing of workpieces, the stored optical offset and imaging errors are compensated for.

10. An apparatus according to claim 9, further comprising:
- a mirror for diverting the image of the calibration plate into the first means, said mirror being placed in a beam path of the laser means between a device for shaping the laser beam and the deflection unit, said mirror being transparent to a laser light from the laser means, said mirror being transparent to a laser light from the laser means, and said mirror being reflective to a light with which the first means records the image of the calibration plate.

11. An apparatus according to claim 9, wherein
- the first means is further for recording reference points that are arranged on one of the workpieces to be processed,
- the second means is further for determining a workpiece's influence on an imaging, said influence on the imaging based on said recording while taking into account the imaging errors and the optical offset;
- the third means is further for storing the workpiece's influence on the imaging and wherein the workpiece's influence is taken into account during subsequent processing of the workpiece.

* * * * *